United States Patent
Focke et al.

[11] Patent Number: 5,149,162
[45] Date of Patent: Sep. 22, 1992

[54] DEVICE FOR CONVEYING LAYERS COMPRISING A MULTITUDE OF INDIVIDUAL OBJECTS

[75] Inventors: Heinz Focke, Verden; Johannes Holloch, Langwedel, both of Fed. Rep. of Germany

[73] Assignee: Focke & Co. (GmbH & Co.), Verden, Fed. Rep. of Germany

[21] Appl. No.: 560,637

[22] Filed: Jul. 31, 1990

[30] Foreign Application Priority Data

Aug. 8, 1989 [DE] Fed. Rep. of Germany ....... 3926121

[51] Int. Cl.$^5$ .............................................. B66C 1/02
[52] U.S. Cl. ...................... 294/64.1; 294/65; 414/793
[58] Field of Search ............... 294/64.1, 65; 414/793, 414/796.2, 797

[56] References Cited

U.S. PATENT DOCUMENTS

| | | | |
|---|---|---|---|
| 3,598,439 | 8/1971 | Dahlquist et al. | 294/65 |
| 3,780,884 | 12/1973 | Jones | 414/793 |
| 3,885,705 | 5/1975 | French | 294/65 X |
| 3,910,621 | 10/1975 | Hillier | 294/64.1 |
| 4,389,064 | 6/1983 | Laverriere | 294/64.1 |
| 4,787,662 | 11/1988 | Dewez | 294/65 X |

FOREIGN PATENT DOCUMENTS

| | | |
|---|---|---|
| 2258007 | 11/1973 | Fed. Rep. of Germany . |
| 3234216 | 3/1984 | Fed. Rep. of Germany . |
| 209424 | 5/1984 | Fed. Rep. of Germany . |
| 88135217 | 4/1989 | Fed. Rep. of Germany . |
| 3741091 | 6/1989 | Fed. Rep. of Germany . |
| 2184072 | 12/1973 | France . |
| 2265659 | 10/1975 | France . |
| 2561221 | 9/1985 | France . |
| 753771 | 8/1980 | U.S.S.R. ............................ 294/64.1 |
| 2189209 | 10/1987 | United Kingdom ................ 414/793 |

Primary Examiner—Robert J. Spar
Assistant Examiner—Janice Krizek
Attorney, Agent, or Firm—Sughrue, Mion, Zinn Macpeak & Seas

[57] ABSTRACT

The invention concerns a device for conveying layers comprising a multitude of individual objects, in particular glasses, cans, etc., preferably for loading and unloading pallets, a suction head being provided for picking up a layer of individual objects, which suction head has a plurality of suction holes. On the one hand, said suction holes face the top side of the objects and, on the other hand, are connected to a source of negative pressure. To avoid a breakdown of the negative pressure as a result of suction holes not being allocated over individual objects, a long flow duct is connected to each suction hole on the side facing away from the individual objects, which flow duct is coupled with the source of negative pressure or the suction chamber.

8 Claims, 4 Drawing Sheets

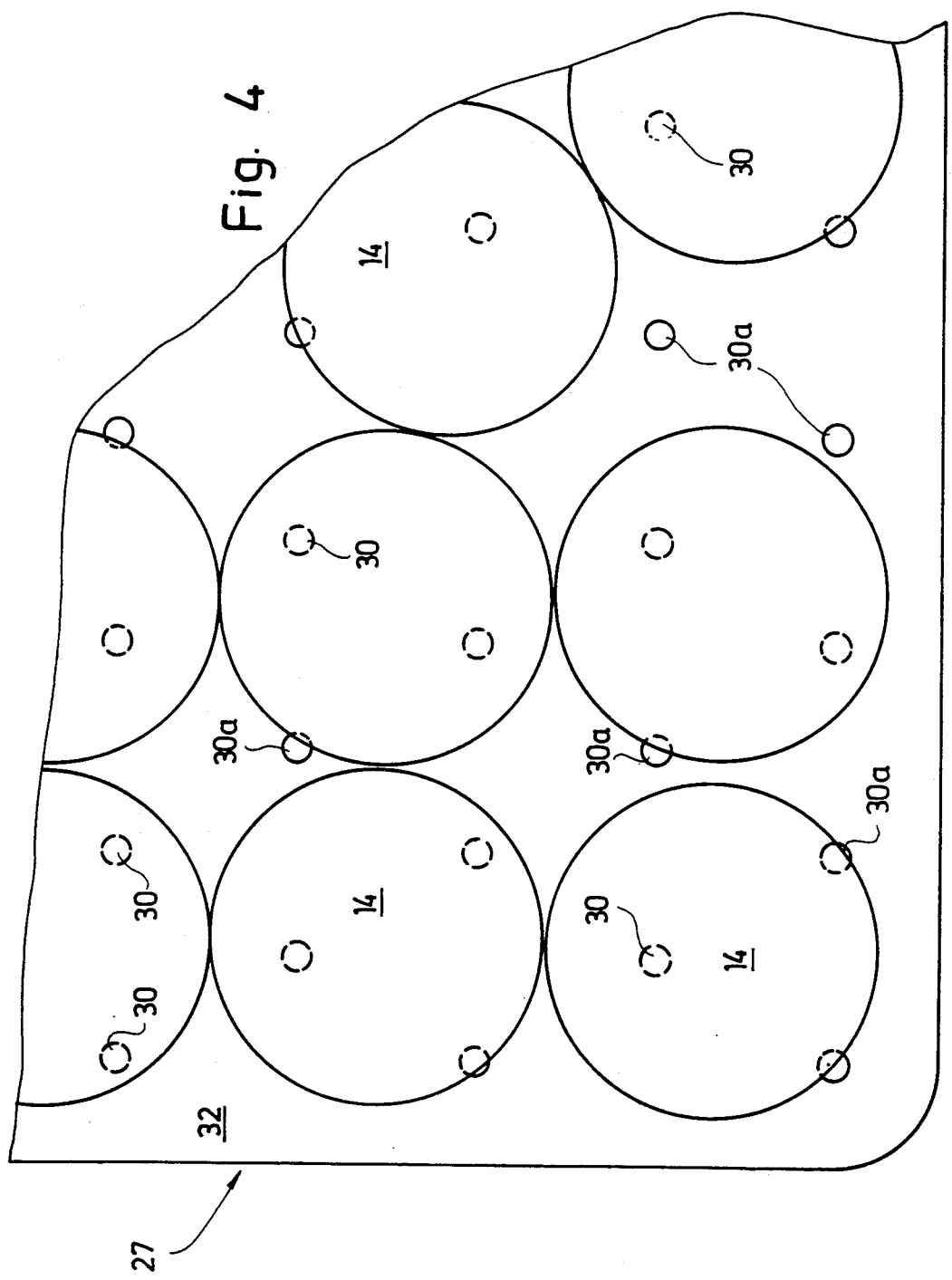

DEVICE FOR CONVEYING LAYERS COMPRISING A MULTITUDE OF INDIVIDUAL OBJECTS

BACKGROUND OF THE INVENTION

The invention relates to a device for conveying layers comprising a multitude of individual objects, in particular glasses, cans, etc., preferably for loading and unloading pallets.

In this context, conveying is understood to mean both the lifting and the transporting as well as the setting down of layers comprising a multitude of individual objects.

The invention concerns the layered palletizing and depalletizing of individual objects. For this purpose, use is customarily made of a palletizer with a suction head, the objects being held at their top side by means of suction air. The suction head for a palletizer of this type is customarily constructed in such a way that a plurality of suction holes is connected to a common suction chamber with a source of negative pressure. The source of negative pressure is designed in such a way that, with a relatively small negative pressure, no great amount of air is conveyed. At the same time, a resilient layer of padding is frequently arranged on the underside, which layer of padding is placed on the top side of the objects to be lifted, whilst being squeezed to a certain extent, and thereby ensures that the negative pressure is indeed effective on the top side of the objects.

Of course, the suction head must have at least as many suction holes as individual objects are provided within one layer. However, since the individual objects within one layer are frequently not aligned absolutely precisely or the relative position of the individual objects within the layer does not correspond precisely to the arrangement of the suction holes in the suction head, a relatively large number of small suction holes must be provided for proper holding of all the individual objects of one layer and, to be precise, with such spacing that the top side of an individual object is always in the region of at least one suction hole. On the other hand, this results, particularly in the case of round individual objects, in the fact that individual suction holes are not allocated to an individual object and therefore ambient air is taken in via these "vacant" suction holes. If this is the case with several suction holes, the negative pressure breaks down and thus proper holding of the individual objects of a layer is no longer possible.

To avoid this disadvantage, it has already been proposed to reduce the flow cross section of those suction holes which, in individual cases, are not allocated to an individual object in order in this manner to take in as little air from the surroundings as possible via these "vacant" suction holes. For this purpose, valves are provided in the region of all the suction holes, which valves partially close the suction holes under corresponding pressure conditions in order in this manner to reduce their cross section. However, due to the provision of a valve in the region of each suction hole, this construction is very complex. Besides, this constructionally complex design is, relatively speaking, very susceptible to faults, in particular in respect of the risk of impairing the action of the valve due to particles of dirt contained in the air taken in.

SUMMARY OF THE INVENTION

The underlying object of the invention is therefore to design the device described in respect of its generic type at the beginning in such a way that the breakdown of the negative pressure required for holding the individual objects of a layer as a result of "vacant" suction holes is prevented in a manner which does not necessitate considerable and complicated constructional expenditure and can be considered as virtually non-susceptible to faults.

As a result of the long flow ducts, provided according to the invention, following the suction holes of the suction head, a flow resistance occurs which leads to a pressure loss in the flow ducts while the air is flowing through—this does not apply for the "vacant" suction holes This, in turn, means that the negative pressure prevailing in the suction chamber or arising from the source of negative pressure does not prevail to its original degree at the free end of the suction hole and thus, as a result of the smaller negative pressure prevailing there, less air is taken in from the surroundings via the suction hole and the flow duct towards the source of negative pressure or the suction chamber and consequently the negative pressure existing there per se is impaired to a lesser extent. This lesser impairment results in the only slightly impaired negative pressure prevailing at the non-"vacant" suction holes and consequently individual objects can be lifted there in the appropriate manner. The influence of the "vacant" suction holes on the effect of the suction head can thus be reduced by the development according to the invention to such an extent that the effectiveness of the suction head in respect of picking up all the individual objects of a layer is not impaired.

For an advantageous influence on the negative pressure at the "vacant" suction holes, it is recommended for the flow ducts to be constructed with such narrowness and such a length that the pressure drop caused by their narrowness and length when the air flows through approximately corresponds to one to two thirds, preferably half, of the negative pressure of the source of negative pressure or the suction chamber. It is guaranteed by this means that only such a small negative pressure prevails at the "vacant" suction holes that the amount of air taken in as a consequence is so small that, to maintain the otherwise required negative pressure from the source of negative pressure, no very large amounts of air have to be pumped off in order to maintain the effectiveness of the suction head in the required manner.

An expedient dimensioning of the flow ducts is one which has an inside diameter of 2 to 6 mm, preferably 4 mm, and a length of 10 to 50 cm, preferably 30 cm. Calculations have shown that, when using flow ducts with an inside diameter of 4 mm water column, corresponding to negative pressure of 90 mm water column, corresponding to lifting individual objects without excessive amounts of air having to be drawn off by the "vacant" suction holes via the source of negative-pressure air. Besides, a negative pressure of 0.09 bar prevailing at the non-"vacant" suction holes is sufficient in the case of individual objects with a round contact surface for the negative pressure in the case of a diameter of 100 mm for lifting approximately 7 kg mass per individual object.

In an expedient manner, the flow ducts should be constructed as a tube, hose or the like which are either to be plugged into the suction holes in the case of a corresponding further development of the latter or plugged onto projections of the suction holes. The use of tubes or hoses not only constitutes an inexpensive design of the flow ducts, but it also enables any required exchange to be done in the case of blockages or the like in an inexpensive and time-saving manner.

If, in a further advantageous development, the tubes, hoses or the like extend inside the suction chamber, the effective negative pressure also prevails outside said suction chamber and not for instance the pressure of the ambient air, with the result that the tubes or hoses are not deformable as a result of for instance a pressure difference and, in particular, cannot be altered in cross section, which could possibly lead to blockages as a result of particles of dirt.

The invention is explained in greater detail below with reference to the drawings, in which:

BRIEF DESCRIPTION OF THE DRAWINGS

FIG. 3 shows the suction head of the device according to the invention in a vertical longitudinal section and FIG. 4 shows a partial view from below of the suction head of FIG. 3 with simultaneous illustration of the individual objects of a layer, the individual objects being at least partially displaced in relation to their intended position.

DESCRIPTION OF A PREFERRED EMBODIMENT

Figure 1:
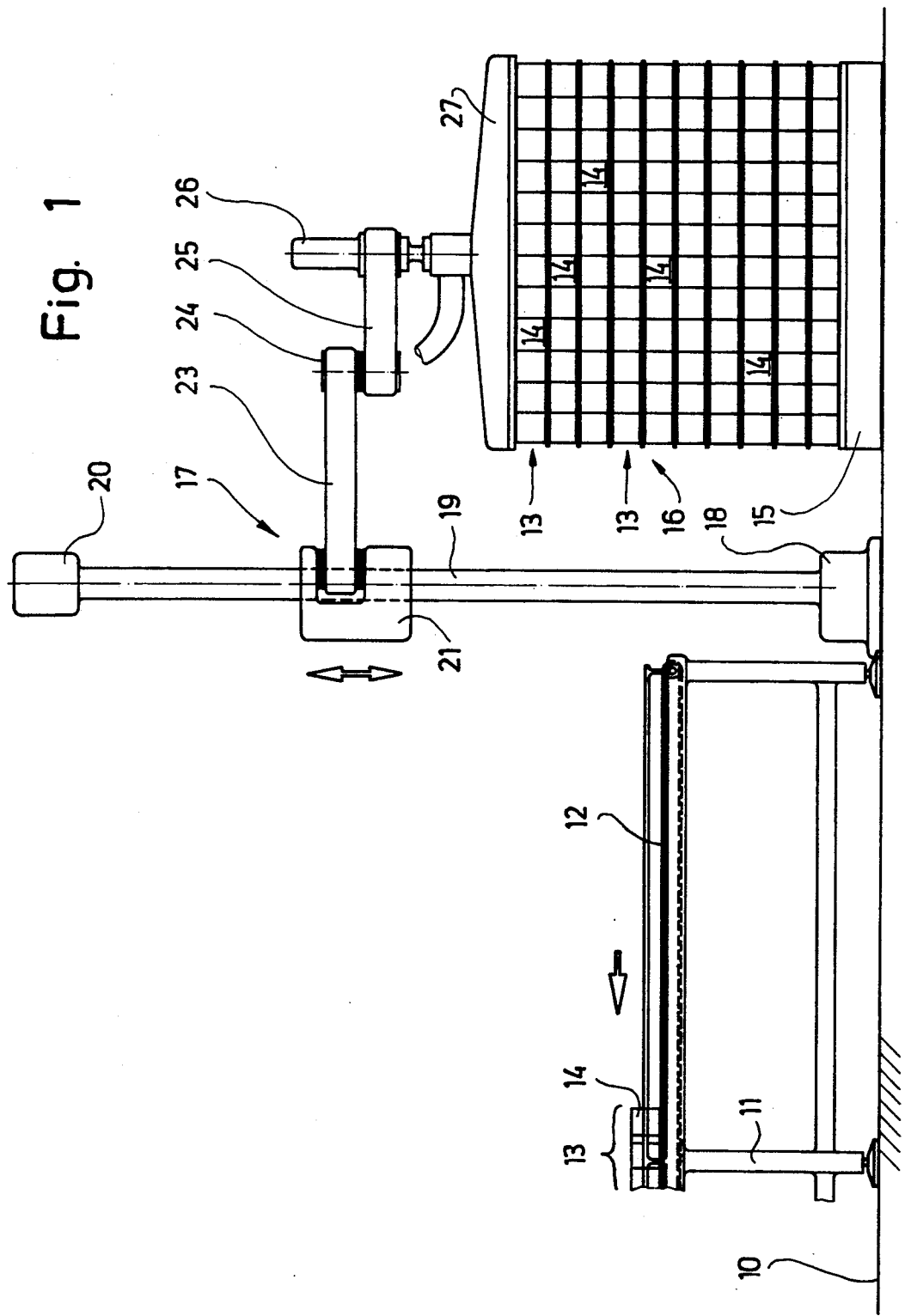
FIG. 1 shows a device according to the invention together with a stack set down on a pallet comprising several layers of individual objects and with a conveying apparatus for supplying or removing individual layers of individual objects.

Shown in the left part of FIG. 1 is the frame 11 of a conveyor belt 12 supported on a foundation 10. Said conveyor belt serves for supplying and removing layers 13 comprising a multitude of individual objects 14.

Furthermore, shown in the right part of FIG. 1 is a pallet 15, likewise placed on the foundation 10, with a total of ten layers 13 comprising individual objects 14. The layers 13 supported on the pallet 15 form in their entirety a stack 16.

The device according to the invention serves to build up a stack 16 according to the illustration in the right part of FIG. 1 comprising individual layers 13 on top of one another which are supplied by means of the conveyor belt 12 or to remove a stack of this kind by taking off the individual layers 13 by means of the conveyor belt 12.

Figure 2:
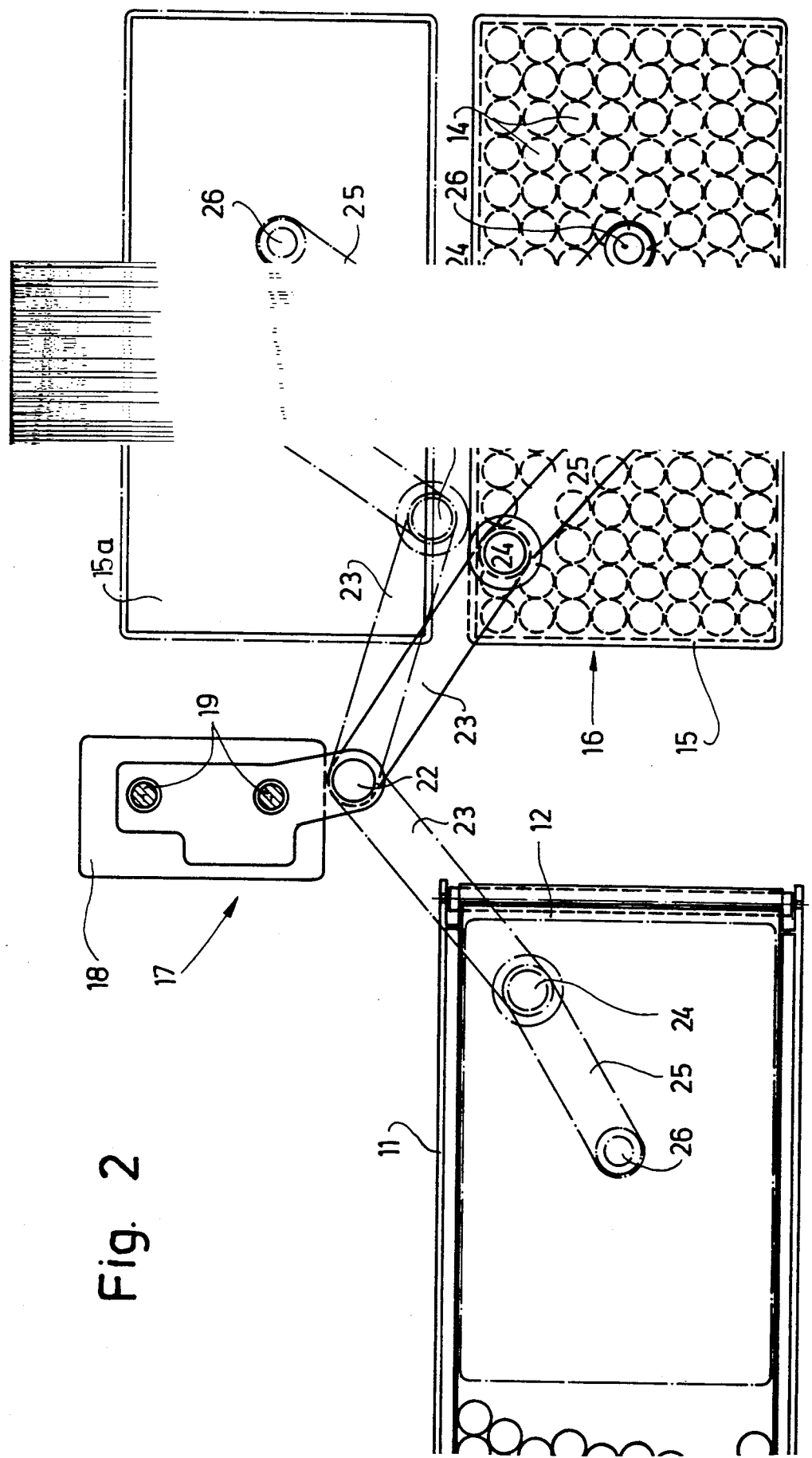
FIG. 2 shows the device of FIG. 1 according to the invention in a plan view with simultaneous illustration of a second pallet station.

In order that, at the moment of complete removal or at the moment of complete build-up of a stack 16, no idling times occur during transferral of the individual layers 13 from the conveyor belt 12 or onto the latter, according to the illustration in the right part of FIG. 2, two pallet stations are provided closely adjacent to one another, at one of which the pallet 15 of FIG. 1 is placed while a further pallet 15a is set down at the other station.

Arranged in the region between the conveyor bet 12 and the stack 16 of the pallet 15 (according to FIGS. 1 and 2) is a device according to the invention denoted as a whole as 17. This device 17 constitutes in its basic construction a customary conveying device for lifting, lowering and transferring objects and is supported with a frame foot 18 on the foundation 10 or is attached there. Extending upwards from the frame foot 18 are two stand columns 19 which are situated one behind the other according to FIG. 1 and are recognizable in detail in the plan view of FIG. 2. At the top end, the two stand columns are fixed in a column head 20.

A transverse lifting beam 21 is movable upwards and downwards on the two stand columns 19 via customary drive means (not illustrated). Mounted via a pivot 22 on this transverse lifting beam 21 is a first swivel arm 23. At its end facing away from the transverse lifting beam 21, this swivel arm 23, in turn, bears a second swivel arm 25 which is mounted in a swivelling manner via a pivot 24.

Mounted in a swivelling manner via a further pivot 26 at the end of the second swivel arm 25 opposite the pivot 24 is a suction head 27.

The means for swivelling the suction head 27 by means of the swivel arms 23 and 25 via the pivots 22, 24 and 26 are of a customary type and are therefore not illustrated in detail. The swivelling movement of the suction head 27 is clearly recognizable in its entirety from the plan view of FIG. 2.

Figure 3:
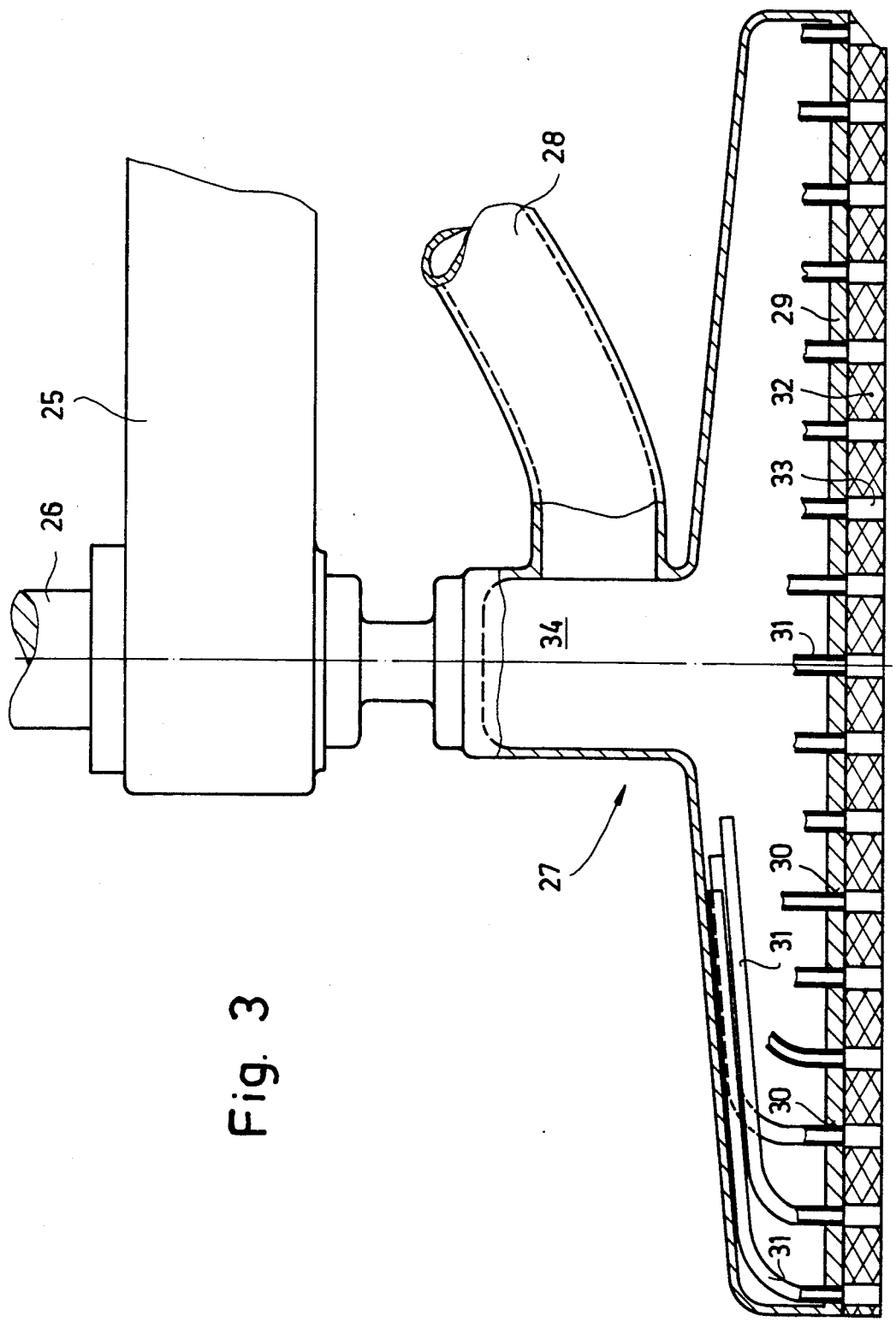

According to the illustration in FIG. 3, the suction head 27 is constructed as a hollow body which is connected by means of a projection 28 to a source of negative pressure via a line (not illustrated). The underside of the suction head 27 is constructed as a flat boundary wall or plate 29, in which a plurality of suction holes 30 is constructed, in each of which a hose 31 serving as a flow duct is inserted. Arranged on the underside of the boundary wall or plate 29 is a resilient layer of padding 32 which, in turn, has corresponding holes 33 as an extension of the suction holes 30. The layer of padding 32 serves for balancing out unevenness at the top sides of the individual objects 14 in order in this manner to guarantee an airtight closure at their edges so that the individual objects 14 can be lifted by means of the negative pressure put into effect by the source of negative pressure.

The inside cavity of the hollow body constituting the suction head 27 forms a suction chamber 34 downstream from the source of negative pressure, in which suction chamber virtually that negative pressure arising from the source of negative pressure prevails. The hoses 31 inserted in the suction holes 30 are situated inside the suction chamber 34 and also open out there, with the result that the negative pressure prevailing in the suction chamber 34 also prevails in the interior of the hoses 31 and consequently in the suction holes 30 insofar as suction holes are concerned which, on the underside of the suction head 27 or of the layer of padding 32, are allocated to the top side of an individual object 14. If, in contrast, the suction hole is a hole designated above as a "vacant" suction hole 30a, that is to say one which, on the underside of the suction head 27, opens out freely into the surroundings and is thus not allocated to a top side of an individual object 14, air from outside flows into the suction chamber 34 through this "vacant" suction hole 30a and the associated hose 31 under the effect of the negative pressure. Due to the narrow and long construction of the hoses 31 as the flow duct, the flow of air through the hose 31 is subject to a high degree of resistance with the consequence of a considerable pressure drop. This means that the negative pressure prevailing inside the suction chamber 34 at the free end of the "vacant" suction holes 30a does not prevail to its original degree but only to a considerably reduced degree, for example reduced to half the degree of negative pressure inside the suction chamber 34. This severe pressure drop causes a correspondingly reduced intake of air from the free surroundings into the interior of the suction chamber 34 and consequently in the direction towards the source of negative pressure, with the result that, by means of the latter, the negative pressure required to maintain the suction force for lifting the individual objects 14 of a layer 13 can be maintained with the discharge of only a relatively small amount of air. For the dimensioning of the hoses 31 as flow ducts, reference is made to the comments already made above where expedient dimensioning specifications have been given.

Instead of plugging the hoses 31 into the suction holes 30, projections, in particular in the form of nipples, can be provided on the inside of the boundary wall or plate 29, onto which projections the hoses 31 can be plugged. The fixing of the hoses 31 to the boundary wall 29 or in extension of the suction holes 30 should always be carried out in such a way that the hoses 31 or any tubes provided in their place can easily be exchanged. This exchangeability serves for removing any blockages due to particles of dirt which are taken in from the surroundings via the "vacant" suction holes 30a. Since the hoses 31 serve exclusively for the development of a considerable pressure drop, said hoses do not otherwise need to fulfil any special conditions, with the result that, for example, the simplest plastic hoses can be used which are simply exchanged for new hoses in a time-saving and cost-saving manner in the case of blockages. To facilitate this exchangeability and otherwise to facilitate the attachment of the hoses 31 to the boundary wall 29 or the suction holes 30, the boundary wall 29 should be able to be dismantled from the remaining part of the body of the suction head 27 in a manner which is, however, not illustrated.

The provision of flow ducts, in particular in the form of the illustrated hoses 31 connected to the suction holes 30 guarantees, as a result of the pressure drop occurring when the air flows through, a satisfactory effect of the negative pressure arising from the source of negative pressure on the top sides of individual objects 14 to be lifted insofar as said objects are situated in the region of suction holes. The negative pressure thus coming into effect there is not, as would be expected as a result of "vacant" suction holes 30a, reduced to such an extent that the suction force required for lifting the individual objects 14 is no longer available in the required manner. As clearly shown in the bottom view of FIG. 4, the circular holes or bores 30, 30a are arranged in offset rows and are spaced apart by horizontal distances which guarantee that at least one bore 30 engages the top side of each of the larger circular objects 14; i.e., the horizontal distances between bores are smaller than the diameter of the objects 14.

What is claimed is:

1. A device for conveying layers each of which contains a plurality of individual objects, said device comprising:

a) suction head means (27) for picking up a layer of individual objects (14) by directly contacting top sides of the objects in the layer,
   said suction head means (27) comprising a hollow suction chamber (34) having a connection means (28) for connection to a vacuum source which produces a negative pressure in said suction chamber, and
   said suction chamber (34) being bounded at a bottom side thereof by a flat suction plate (29) which directly contacts the top sides of the objects;
   b) a plurality of vertically extending suction bores (33) disposed in said suction plate (29) for direct juxtaposition with said top sides of the objects,
   said bores (33) being spaced apart by such horizontal distances that each object (14) is directly acted upon on its top side by at least one of said bores (33), said horizontal distances between said bores (33) being smaller than a horizontal dimension of the objects (14), and
   said bores (33) opening out into said suction chamber (34); and
   c) a plurality of flow ducts (31) in the form of flexible tubes for conducting air between said suction bores (33) and the vacuum source, each flow duct (31) having a first end, connected to a respective one of said bores (33), and an opposite free open end,
   said flow ducts (31) being of approximately equal length and being located completely—including each free open end as well—within said suction chamber (34).

2. Device according to claim 1, characterized in that the flow ducts (31) are constructed with such narrowness and such length that the pressure at the free open ends of the flow ducts approximately corresponds to one to two thirds of the negative pressure of the suction chamber (34).

3. Device according to claim 2, characterized in that the flow ducts (31) have an inside diameter of 2 to 6 mm and a length of 10 to 50 cm.

4. Device according to claim 1, characterized in that the tubes (31) which are plugged into the suction bores (33) constructed correspondingly widened for receiving the tubes.

5. The device according to claim 3, wherein said inside diameter is 4 mm.

6. Device according to claim 5, wherein said length is 30 cm.

7. Device according to claim 2, wherein said tubes are elongated and have a length substantially longer than that of said bores, and wherein each of said suction bores and said elongated tubes forms an airflow path of constant, unconstricted cross-section so that the drop in pressure which occurs when air flows through the tubes primarily depends upon the length of said elongated tubes.

8. The device according to claim 1, wherein said plurality of said bores have circular cross sections and wherein said bores all have the same diameter.

* * * * *